US012560170B2

(12) United States Patent (10) Patent No.: US 12,560,170 B2

Ecklesdafer (45) Date of Patent: Feb. 24, 2026

(54) SYSTEMS, DEVICES, AND/OR METHODS FOR MANAGING WATER

(71) Applicant: Eric Ecklesdafer, Champlain, VA (US)

(72) Inventor: Eric Ecklesdafer, Champlain, VA (US)

(*) Notice: Subject to any disclaimer, the term of this patent is extended or adjusted under 35 U.S.C. 154(b) by 0 days.

(21) Appl. No.: 19/117,831

(22) PCT Filed: Nov. 22, 2022

(86) PCT No.: PCT/US2022/050664

§ 371 (c)(1),
(2) Date: Apr. 2, 2025

(87) PCT Pub. No.: WO2024/112328

PCT Pub. Date: May 30, 2024

(65) Prior Publication Data

US 2026/0009386 A1     Jan. 8, 2026

(51) Int. Cl.
| | |
|---|---|
| *F04D 13/06* | (2006.01) |
| *B01D 35/05* | (2006.01) |
| *F04D 13/08* | (2006.01) |
| *F04D 15/02* | (2006.01) |

(52) U.S. Cl.
CPC .......... *F04D 13/066* (2013.01); *B01D 35/05* (2013.01); *F04D 13/08* (2013.01); *F04D 15/0281* (2013.01)

(58) Field of Classification Search
CPC ............................. F04D 13/066; B01D 35/05
USPC ............................................ 417/61, 330–333
See application file for complete search history.

(56) References Cited

U.S. PATENT DOCUMENTS

| | | | |
|---|---|---|---|
| 5,071,550 A | 12/1991 | Bernhardt | |
| 2010/0054961 A1 | 3/2010 | Palecek | |
| 2012/0138164 A1* | 6/2012 | Bolan .................... | B01D 35/05 |
| | | | 137/154 |
| 2012/0216837 A1 | 8/2012 | Kovarik | |

OTHER PUBLICATIONS

International Search Report and Written Opinion issued Mar. 3, 2023, in international application No. PCT/US2022/050664.

* cited by examiner

*Primary Examiner* — Kenneth J Hansen

(74) *Attorney, Agent, or Firm* — Keefe IP Law, PLLC

(57) ABSTRACT

Certain exemplary embodiments can provide a system, which comprises a pump and a platform. The platform comprises a set of flotation tubes, a pump tube, and an encasement. Each of the set of flotation tubes is constructed to add buoyancy to the platform. The pump tube constructed to be coupled to the pump and house the pump. The encasement substantially surrounds a portion of the pump tube and a portion of at least one of the set of flotation tubes.

20 Claims, 13 Drawing Sheets

1000

2000

2000

2000

2000

9000

10000

13000

SYSTEMS, DEVICES, AND/OR METHODS FOR MANAGING WATER

FIELD OF INVENTION

The present disclosure generally relates to a system, device, and method for managing water.

SUMMARY OF THE DISCLOSURE

The present disclosure is directed to a system including a pump and a platform including a plurality of tubes, a plurality of end plates, and an encasement having a strainer screen.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION AND INDUSTRIAL APPLICABILITY

Certain exemplary embodiments can provide a system, which comprises a pump and a platform. The platform comprises a set of flotation tubes, a pump tube, and an encasement. Each of the set of flotation tubes is constructed to add buoyancy to the platform. The pump tube constructed to be coupled to the pump and house the pump. The encasement substantially surrounds a portion of the pump tube and a portion of at least one of the set of flotation tubes.

Figure 1:
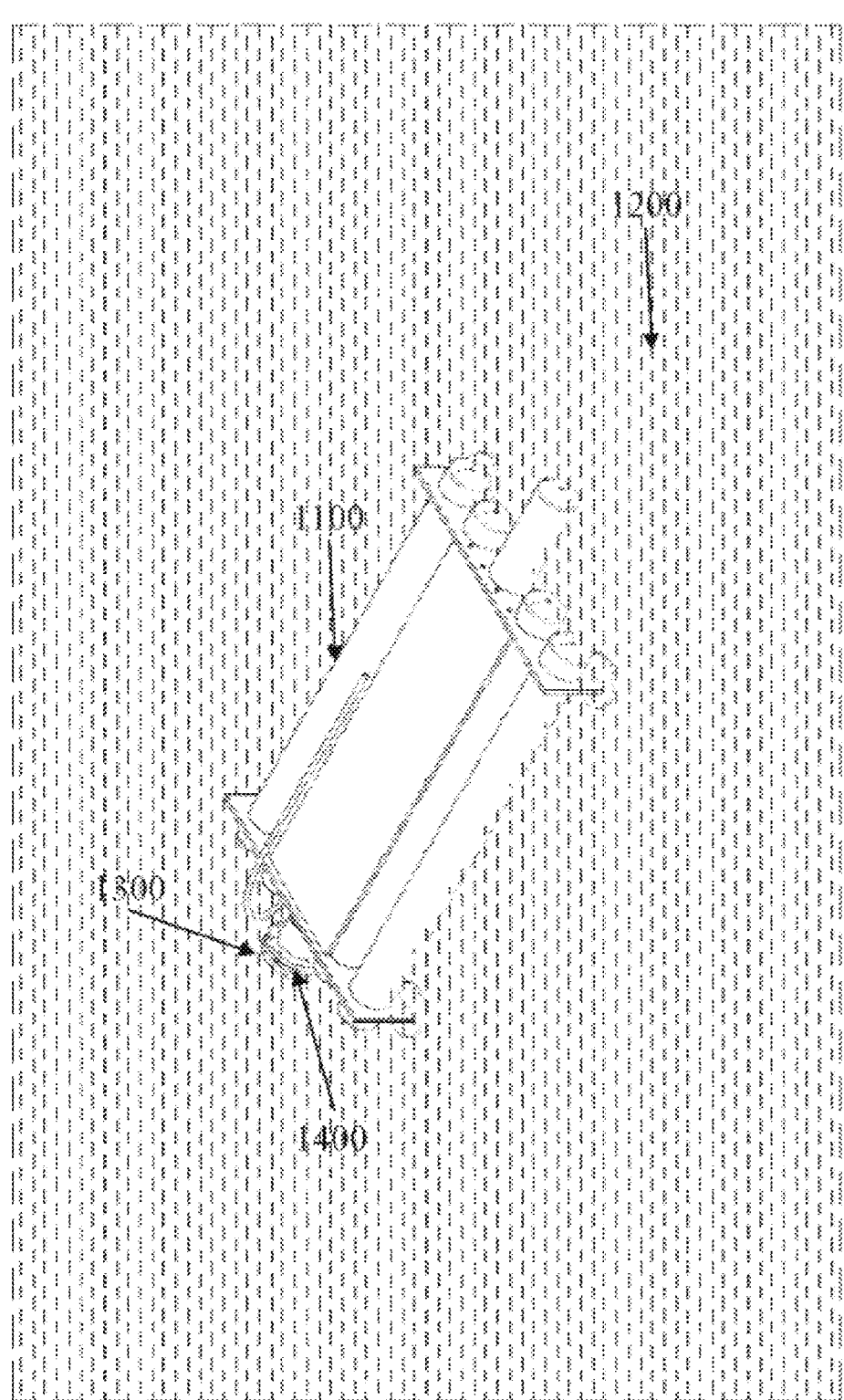
FIG. 1 is a perspective view of an exemplary embodiment of a system 1000.

FIG. 1 is a perspective view of an exemplary embodiment of a system 1000, which comprises a pump station 1100 deployed in a water source 1200. Water source 1200 can be a pond, lake, or stream. Pump station 1100 is constructed to float on, or sink in, a water source 1200 depending upon needs and/or desires of a user.

System 1000 comprises an electrical cable 1300. Electrical cable 1300 is electrically coupled to pump 1400. Electrical cable 1300 is substantially watertight.

Figure 2:
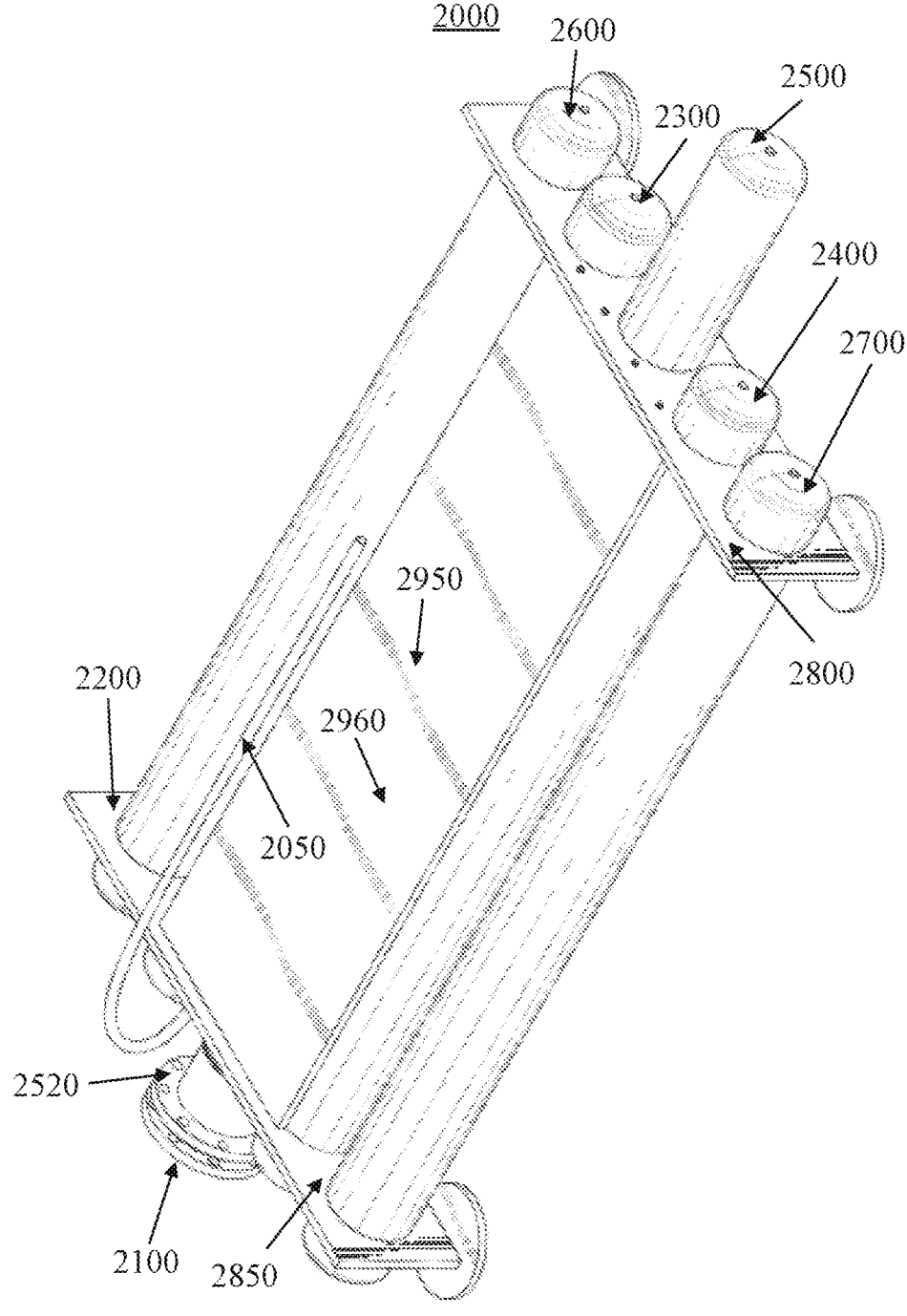
FIG. 2 is a perspective view of an exemplary embodiment of a system 2000.

FIG. 2 is a perspective view of an exemplary embodiment of a system 2000, which comprises a pump 2100 and a platform 2200. Platform 2200 comprises: a first tube 2300;

a second tube 2400;

a third tube 2500, third tube 2500 constructed to be coupled to pump 2100 and house pump 2100; wherein, each of first tube 2300 and second tube 2400 are constructed to add buoyancy to platform 2200, third tube 2500 defines a set of tube apertures (see tube apertures 2900 of FIG. 6) via which water flows to pump 2100;

a first end plate 2800, first end plate 2800 coupled to each of first tube 2300, second tube 2400, and third tube 2500;

a second end plate 2850, second end plate 2850 coupled to each of first tube 2300, second tube 2400, and third tube 2500; and an encasement 2950, encasement 2950 substantially surrounding a portion of each of first tube 2300, second tube 2400, and third tube 2500, encasement 2950 coupled to first end plate 2800 and second end plate 2850, encasement 2950 comprising a strainer screen (see strainer screen 2980 of FIG. 6), the strainer screen located on a bottom of encasement 2950; encasement 2950 comprises a solid top plate, which top plate is sealed in an airtight manner.

In certain exemplary embodiments, system 2000 can comprise:

a fourth tube 2600; and a fifth tube 2700 each of fourth tube 2600 and fifth tube 2700 constructed to add buoyancy to platform 2200.

Platform 2200 can comprise:

materials that resist corrosion relative to carbon steel;

materials that resists conductance of electricity relative to carbon steel;

plastic; and/or steel.

Pump 2100 is coupled to third tube 2500 via a flange 2520. Pump 2100 is restrained from rotation via being coupled to flange 2520. Flange 2520 also substantially centers pump 2100 in third tube 2500.

Platform 2200 comprises:

a set of flotation tubes (e.g., first tube 2300, second tube 2400, third tube 2500, fourth tube 2600, and/or fifth tube 2700). Each of the set of flotation tubes are constructed to add buoyancy to platform 2200;

a pump tube (i.e., third tube 2500 in the illustrated embodiment), the pump tube constructed to be coupled to pump 2100 and house pump 2100;

encasement 2950; encasement 2950 substantially surrounding a portion of the pump tube and a portion of at least one of the set of flotation tubes; and a control tube 2050, control tube 2050 coupled to encasement 2950; control tube 2050 coupled to each of an air source and water source 1200.

Certain exemplary embodiments comprise two control tubes; one (e.g., control tube 2050) constructed to convey air and coupled to a top of tubes comprised by system 2000; and one constructed to convey water and coupled to a bottom of tubes comprised by system 2000.

A top 2960 of encasement 2950 is constructed to be substantially airtight and watertight. When water enters into encasement 2950 via control tube 2050, system 2000 sinks in water source 1200. When air enters into encasement 2950 via control tube 2050, system 2000 rises in water source 1200.

Figure 3:
FIG. 3 is a side view of system 2000.
Figure 3:
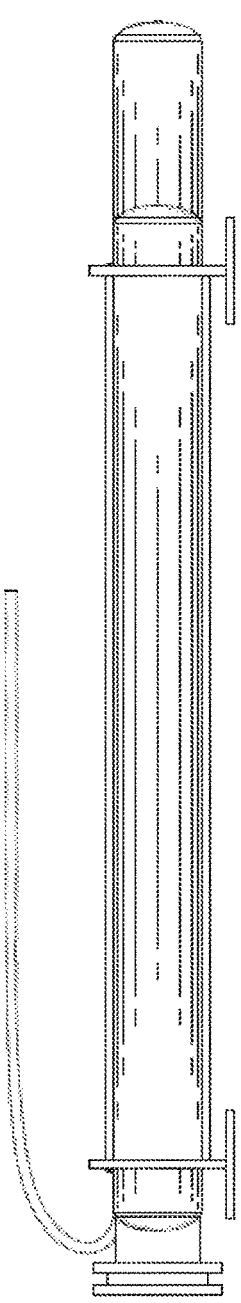

FIG. 3 is a side view of system 2000.

Figure 4:
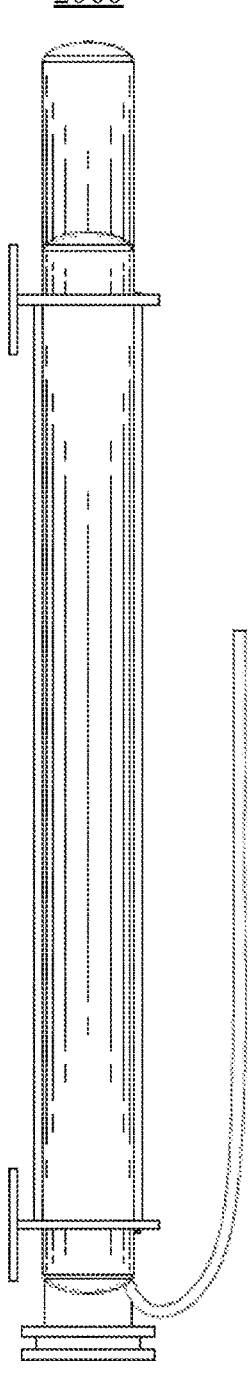
FIG. 4 is a side view of system 2000.

FIG. 4 is a side view of system 2000.

Figure 5:
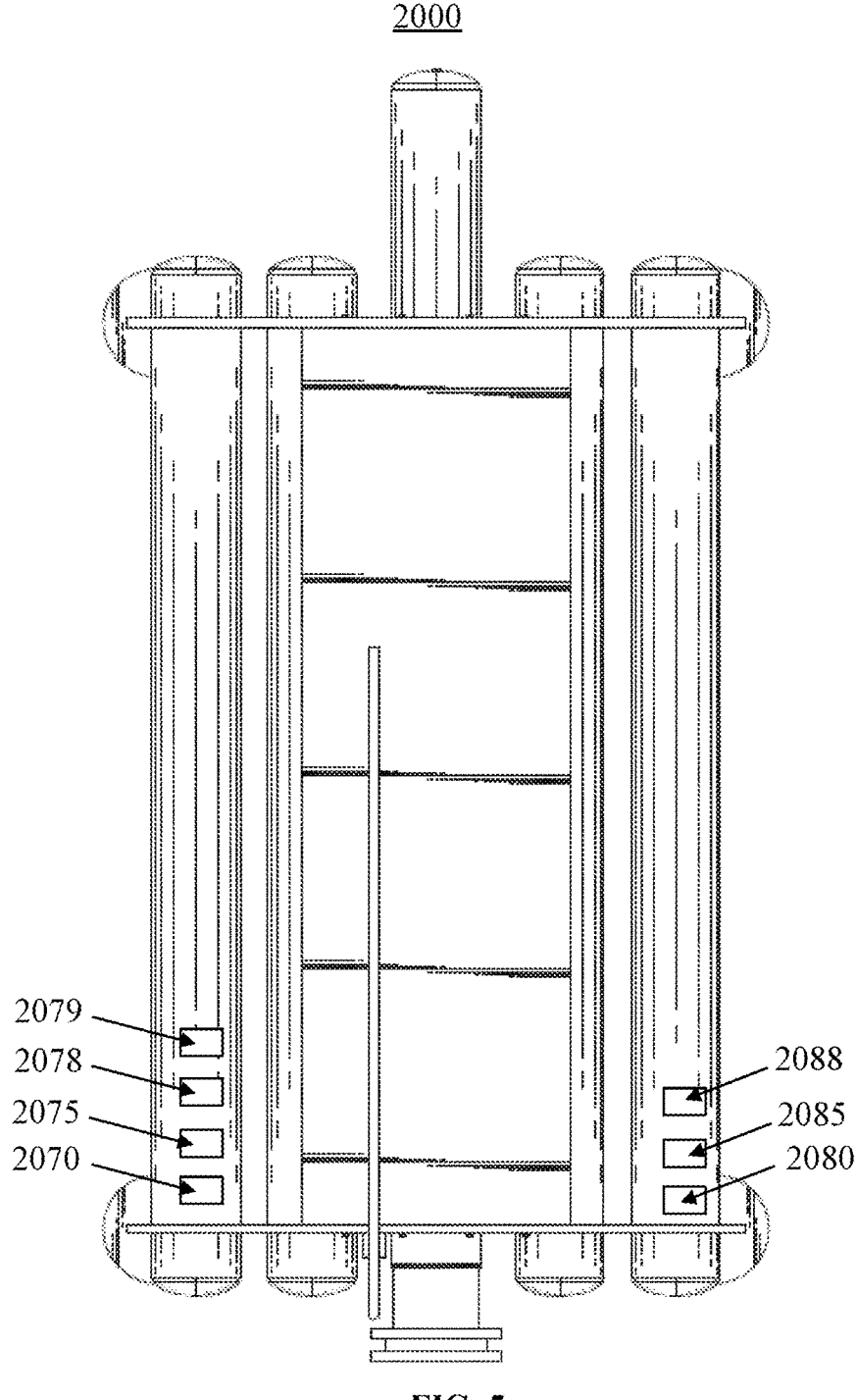
FIG. 5 is a plan view of system 2000.

FIG. 5 is a plan view of system 2000, which illustrates a level sensor 2070, a level controller 2075, a temperature sensor 2080, and a temperature controller 2085. Level sensor 2070 provides a signal indicative of any tilt of system 2000 while system 2000 is in a water source. In certain exemplary embodiments, level controller 2075 can automatically adjust an air distribution in system 2000 to maintain system 2000 in a substantially level state. Certain exemplary embodiments comprise a sonar sensor 2078. Sonar sensor 2078 can be utilized to determine a depth of water below system 2000. Sonar sensor 2078 can be constructed to detect fish, including very small fish, in proximity to system 2000 and to shut system 2000 off if fish of concern are imperiled.

Pumping water during spawning of protected species can also be a consideration in utilization of system 2000. Certain exemplary embodiments comprise a camera 2079. Camera 2079 can obtain and transmit images in proximity to system 2000. Images obtained via camera 2079 can be analyzed. For example, images of fish can be analyzed to determine a presence of fish and/or an identity of fish species in proximity to system 2000. If one or more fish are detected that are protected and/or endangered, certain exemplary embodiments shut pump 2100 off until the detected fish move a predetermined distance from system 2000.

Certain exemplary embodiments can comprise a pressure/vacuum sensor 2088, which can indicate when a strainer screen is clogged.

Temperature sensor 2080 provides a signal indicative of a temperature of the water source. A temperature of water pumped via system 2000 can be automatically adjusted via temperature controller 2085. Temperature controller 2085 can change an amount of air and/or water in encasement 2950 such that an elevation of system 2000 is changeable in the water source to adjust temperature. Water temperature in a water source can vary as a function of elevation.

Figure 6:
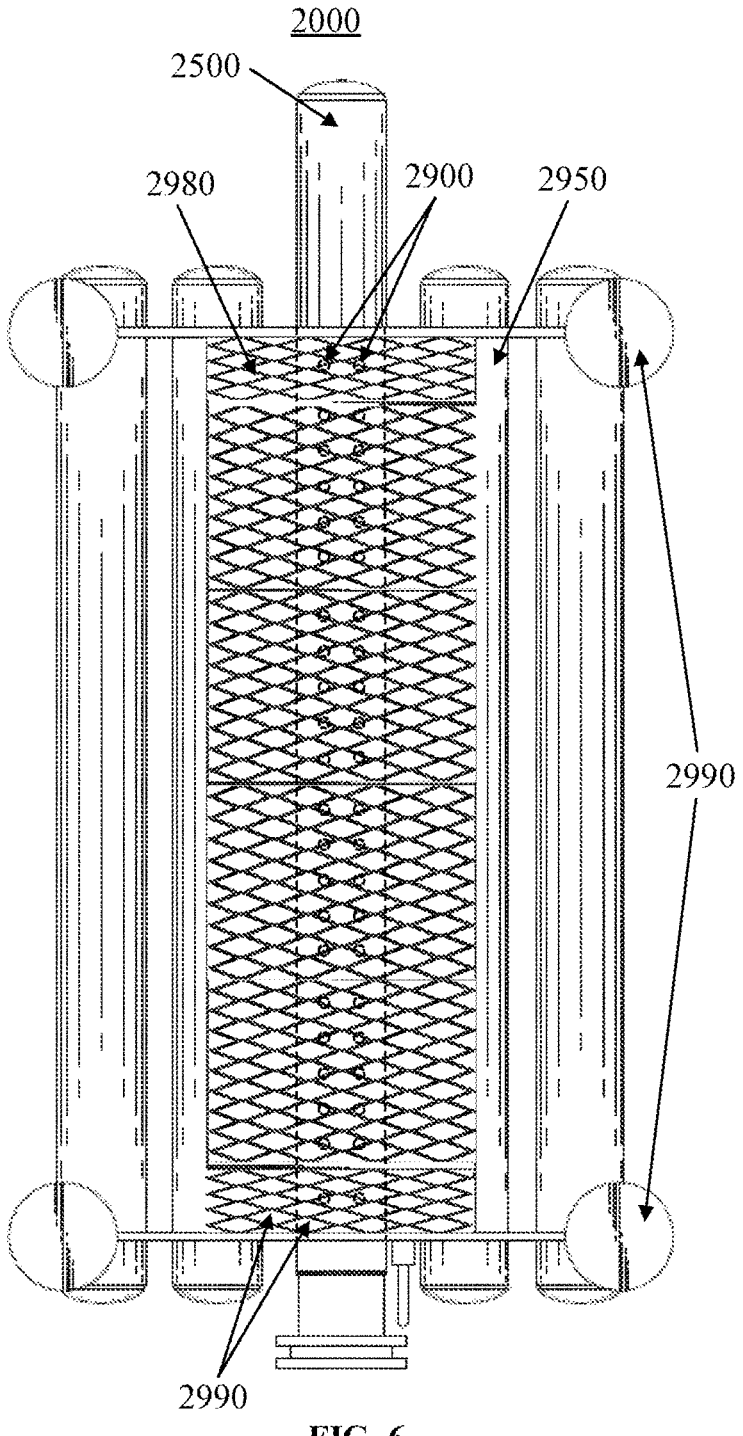
FIG. 6 is a bottom view of system 2000.

FIG. 6 is a bottom view of system 2000, which illustrates a strainer screen 2980 and third tube 2500. Third tube 2500 defines a set of tube apertures 2900.

Strainer screen 2980 is constructed to rest in proximity to a bottom surface of a water source (see water source 1200 of FIG. 1) when encasement 2950 comprises water.

In certain exemplary embodiments:
    strainer screen 2980 can be substantially planar;
        screen apertures 2995 defined by strainer screen 2980 can be less than approximately one millimeter in diameter;
        screen apertures 2995 defined by strainer screen 2980 can be constructed to pass water at a flow rate of less than 0.5 feet per second; and/or
        trash falls off of the strainer screen 2980 when water flow through strainer screen 2980 stops.

In certain exemplary embodiments, encasement 2950 comprises feet 2990. Feet 2990 can be constructed to keep strainer screen 2980 off a bottom of a water source (see water source 1200 of FIG. 1). In certain exemplary embodiments, wheels can be utilized instead of feet 2990. The use of wheels might be less likely to damage pond liners where system 2000 is deployed in a lined pond.

Figure 7:
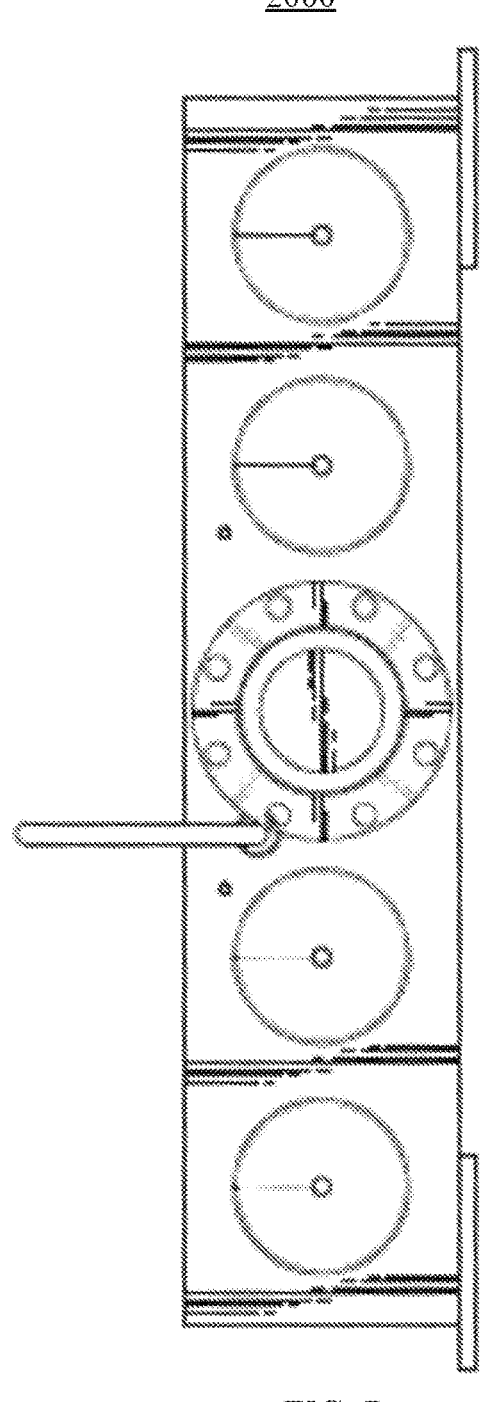
FIG. 7 is an end view of system 2000.

FIG. 7 is an end view of system 2000.

Figure 8:
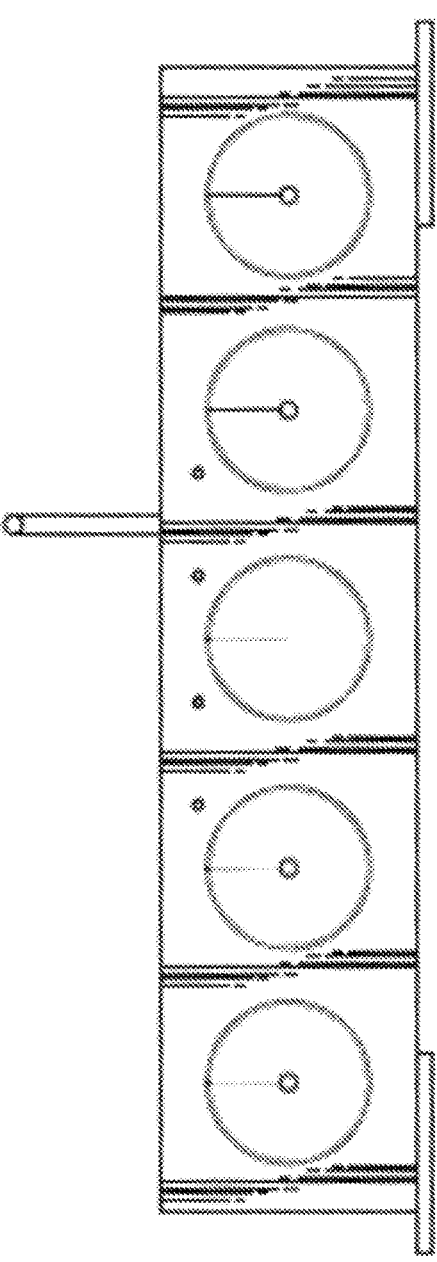
FIG. 8 is an end view of system 2000.

FIG. 8 is an end view of system 2000.

Figure 9:
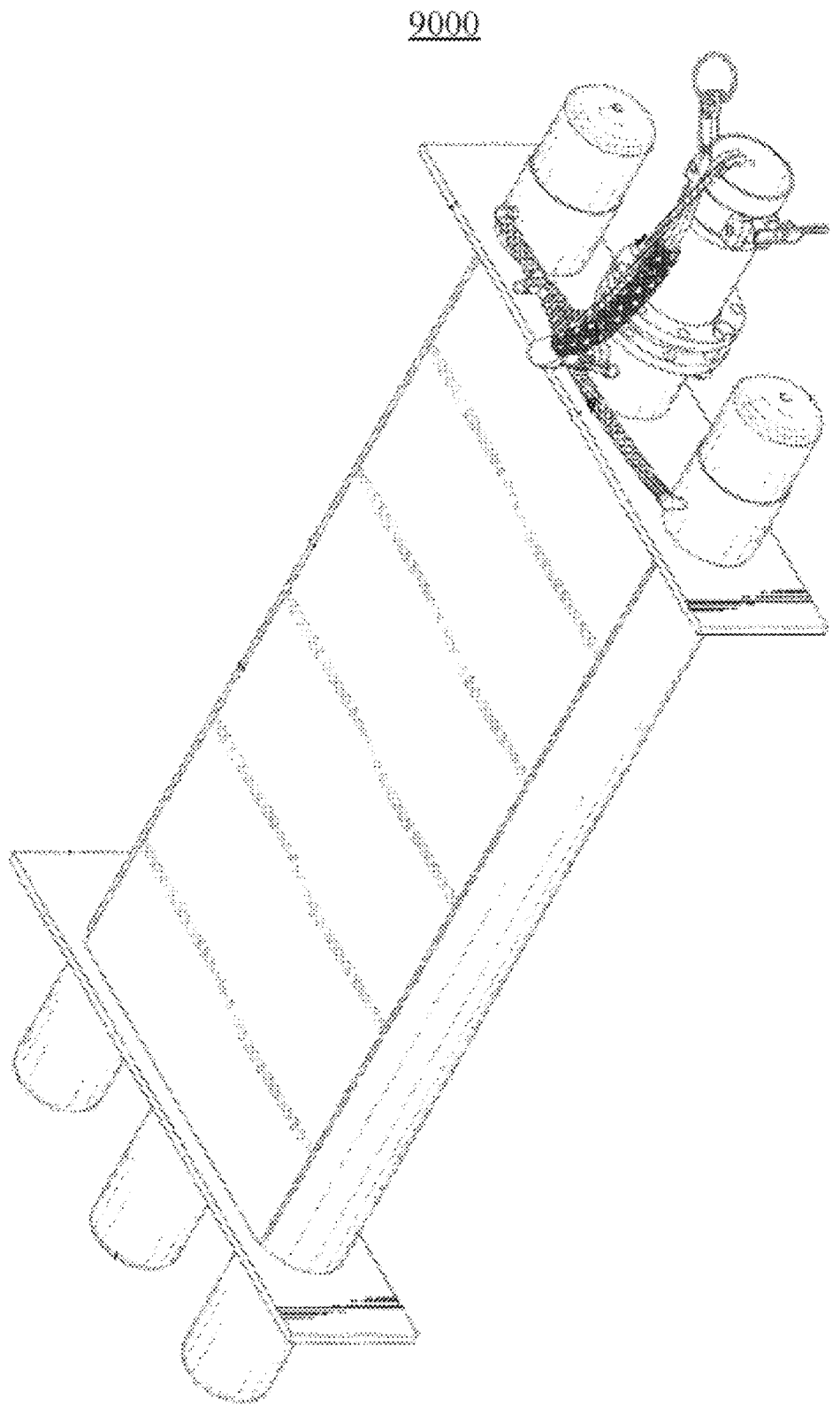
FIG. 9 is a diagram of an exemplary embodiment of a pump 9000.

FIG. 9 is a diagram of an exemplary embodiment of a pump 9000.

Figure 10:
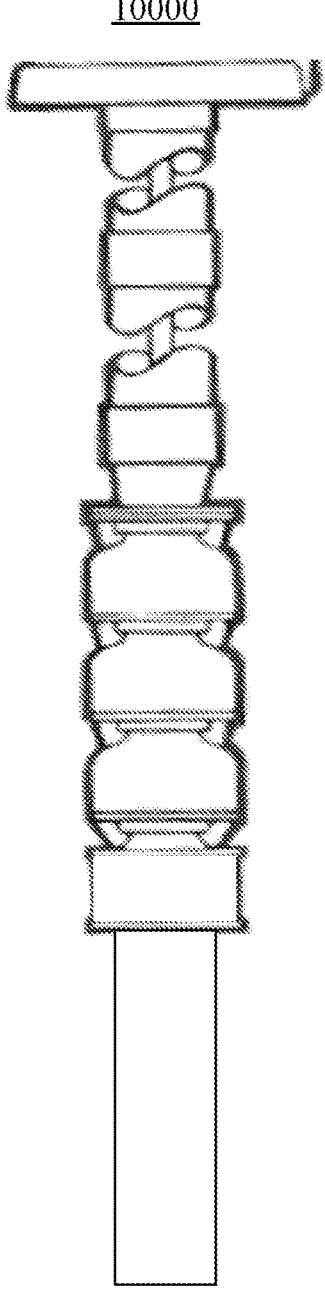
FIG. 10 is a flowchart of an exemplary embodiment of a method 10000.

FIG. 10 is a flowchart of an exemplary embodiment of a method 10000. At activity 10100, a pump system is created. The pump system comprises:
    a pump; and
    a platform, the platform comprises:
        a set of flotation tubes, each of the set of flotation tubes constructed to add buoyancy to the platform;

a pump tube, the pump tube constructed to be coupled to the pump and house the pump;
    the encasement, the encasement substantially surrounding a portion of the pump tube and a portion of at least one of the set of flotation tubes, a top of the encasement constructed to be substantially watertight the encasement comprising a strainer screen, the strainer screen located on a bottom of the encasement; and
    a control tube, the control tube coupled to the encasement, the control tube coupled to each of an air source and a water source.

At activity 10200, the pump system is placed in a water source.

At activity 10300, the platform is leveled via one or more floats. The one or more floats are coupled to the platform.

At activity 10400, air is caused to flow through the control tube to the encasement of the pump system, the air causing the encasement to rise in the water source.

At activity 10500, water is caused to flow through the control tube to the encasement, the water causing the encasement to sink in the water source.

At activity 10600, cleaning the strainer screen via a directed backflow of water.

At activity 10700, responsive to a detected temperature in a water source, an elevation of the pump system in the water source is automatically changed.

Figure 11:
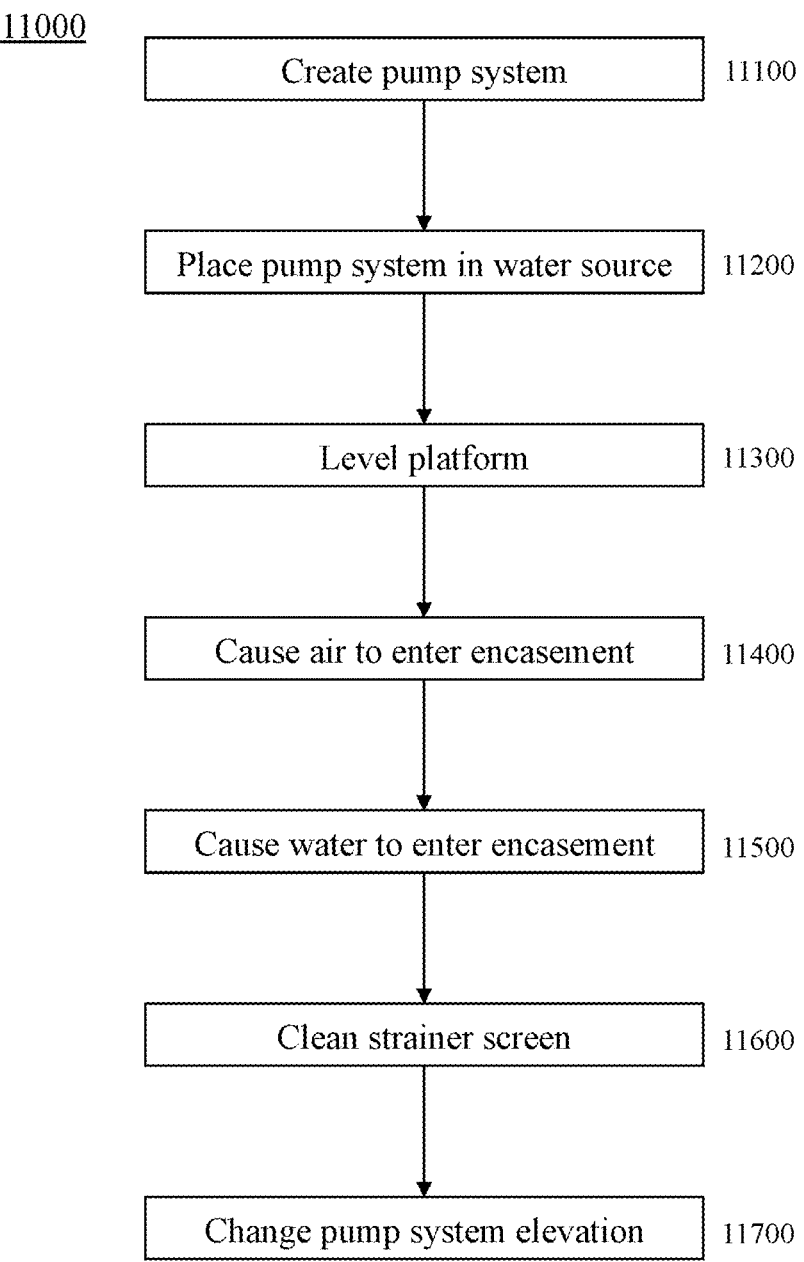
FIG. 11 is a block diagram of an exemplary embodiment of a system 11000.

FIG. 11 is a block diagram of an exemplary embodiment of a system 11000, which can comprise a smartphone 11300, an information device 11100, tablet 11200, a network 11400, a first server 11500, a second server 11600, a third server 11700, and a fourth server 11800. First server 11500 can comprise a first user interface 11520 and can be coupled to a first database 11540. Second server 11600 can comprise a second user interface 11620 and can be coupled to a second database 11640. Third server 11700 can comprise a third user interface 11720, a processor 11760, machine instructions 11780, and can be coupled to a third database 11740. Fourth server 11800 can comprise a fourth user interface 11820 and can be coupled to a fourth database 11840. Any of the methods and/or steps thereof can be carried out in whole or in part by tablet 11200, smartphone 11300, information device 11100 and/or first server 11500. Second server 11600, third server 11700, and/or fourth server 11800 can each be associated with implementation of a system via which water can be pumped from a water source. In certain exemplary embodiments, system 11000 can be used to implement one or more methods disclosed herein.

Figure 12:
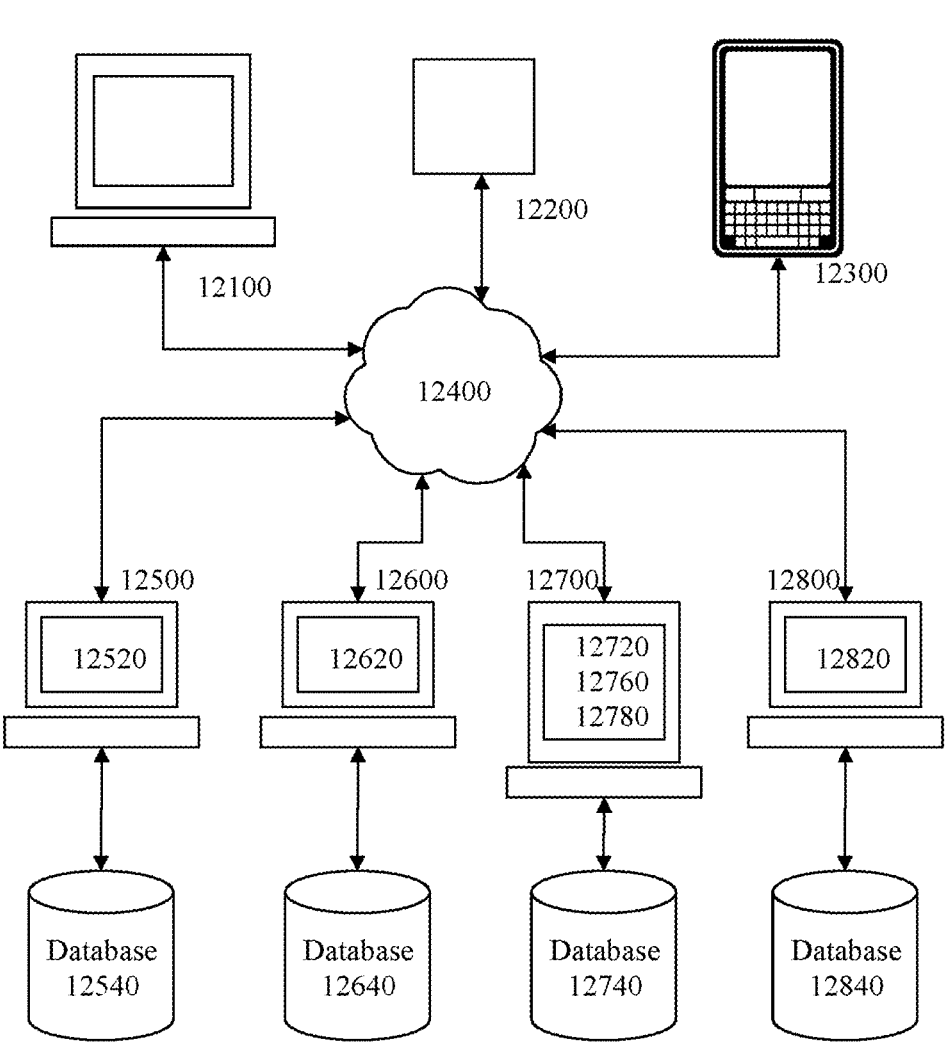
FIG. 12 is a block diagram of an exemplary embodiment of an information device 12000.
Figure 13:
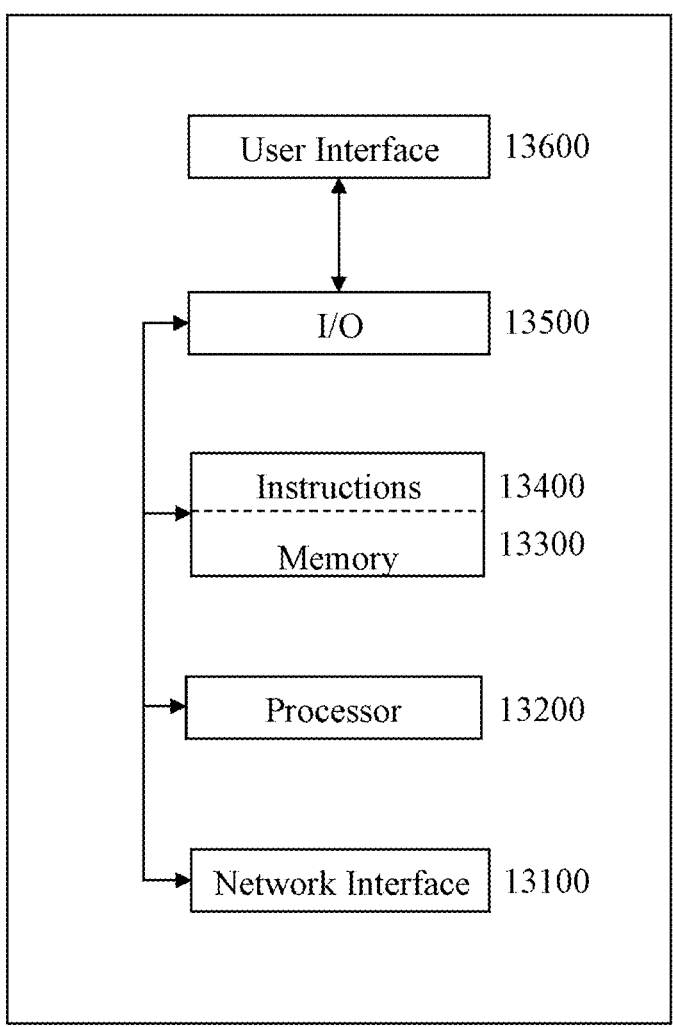
FIG. 13 is a block diagram including refererence numbers 13100, 13200, 13300, 13400, 13500, and 13600 of 13000.

FIG. 12 is a block diagram of an exemplary embodiment of an information device 12000, which in certain operative embodiments can comprise, for example, information device 11100, of FIG. 11. Information device 12000 can comprise any of numerous circuits and/or components, such as for example, one or more network interfaces 12100, one or more processors 12200, one or more memories 12300 containing instructions 12400, one or more input/output devices 12500, and/or one or more user interfaces 12600 coupled to one or more input/output devices 12500, etc.

In certain exemplary embodiments, via one or more user interfaces 12600, such as a graphical user interface, a pump system operator can view and/or control one or more aspects of a pump system.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition:

a at least one.

activity—an action, act, step, and/or process or portion thereof.

adapted to—made suitable or fit for a specific use or situation.

adapter—a device used to effect operative compatibility between different parts of one or more pieces of an apparatus or system.

and/or—either in conjunction with or in alternative to.

aperture—an opening in something.

apparatus—an appliance or device for a particular purpose.

associate—to join, connect together, and/or relate.

automatically—acting or operating in a manner essentially independent of external influence or control. For example, an automatic light switch can turn on upon "seeing" a person in its view, without the person manually operating the light switch.

backflow—moving opposite a normal direction of flow.

bottom—a lowermost portion of something when oriented in an installed and operative position.

buoyancy—a tendency to float in water.

cable—a rope comprising metallic fibers.

can—is capable of, in at least some embodiments.

carbon steel—steel with carbon content from approximately between 0.05 and 2.1 percent by weight.

cause—to produce an effect.

clean—to remove contaminants and/or obstructions.

comprising—including but not limited to.

conduct to transmit.

configure—to make suitable or fit for a specific use or situation.

connect—to join or fasten together.

constructed to—made to and/or designed to.

control—(n) a switch or adjustment that directs one or more activities; (v) to direct one or more activities.

convert—to transform, adapt, and/or change.

convey—to transport from one location to another.

corrosion—deterioration of materials via chemical or electrochemical reaction with their environment.

couple—to link in some fashion.

coupleable—capable of being joined, connected, and/or linked together.

create—to bring into being.

define—to establish the outline, form, or structure of.

detect—to sense or perceive.

determine—to obtain, calculate, decide, deduce, and/or ascertain.

device—a machine, manufacture, and/or collection thereof.

diameter—a length of a line passing through the center of a substantially circular object and meeting the circumference or surface at each end.

direct—to cause to flow via a specific course.

electrical—relating to producing, distributing, and/or operating by electricity.

electrically coupled—connected in a manner adapted to transfer electrical energy.

electricity—the set of physical phenomena associated with the presence and motion of matter that has a property of electric charge.

encase—to completely surround and enclose something.

encasement—a container that at least partially encloses something.

fall—to descend assisted by gravity.

flange—a projecting rim of an object that allows the object to be coupled to another thing.

float—to rest or move on or near the surface of a liquid without sinking.

floatation—having an ability to float and/or be buoyant.

flow—to circulate or move a fluid.

foot—a part of an object that projects from a surface of the object.

house—to at least partially enclose and/or cover.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

inlet—an entry passage.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

keep—maintain.

less than—smaller.

located—positioned.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script, "macro", "file", "project", "module", "library", "class", and/or "object", etc, can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

material something used in making items.

may—is allowed and/or permitted to, in at least some embodiments.

memory device—an apparatus capable of storing analog or digital information, such as instructions and/or data. Examples include a nonvolatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

pass—to go through something.

pipe—a tubular section or hollow cylinder, usually but not necessarily of circular cross-section.

planar—having a substantially flat surface.

plastic—comprising one or more of any of numerous organic synthetic or processed materials that are mostly thermoplastic or thermosetting polymers of high molecular weight and that can be made into objects, films, or filaments.

platform—a structure comprising a substantially horizontal surface plurality—the state of being plural and/or more than one.

portion—a part of a whole.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of micro-processor manufactured by the Intel Corporation of Santa Clara, California. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, give, and/or make available.

pump—a device that raises, transfers, delivers, or compresses fluids.

rate a quantity measured over time.

receive—to get, take, acquire, and/or obtain.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

resist—to be substantially unaltered from something and/or unharmed by something.

responsive—reacting to an influence and/or impetus.

rest—to set in a place.

restrain to limit motion of something.

rise—to move from a lower elevation to a higher elevation.

rotate—to move or cause to move around an axis or center.

rotational direction—a course upon which an object turns around a center or an axis. A rotational direction can be expressed as being, for example, clockwise or counterclockwise relative to a frame of reference.

screen—a mesh that defines apertures, the apertures having a predetermined size.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, demultiplexed, decrypted, and/or decoded, etc.

sink—to go down below a surface of something.

source—an origin of something.

steel—commercial iron that contains carbon in any amount up to approximately 1.7 percent as an alloying constituent, is malleable when under suitable conditions, and is distinguished from cast iron by its malleability and lower carbon content.

stop—to cease.

store to place, hold, and/or retain.

strainer—a device that resists passage of solid pieces while allowing a liquid to pass through.

substantially—to a great extent or degree.

support—to bear the weight of, especially from below.

surface—the outer boundary of an object or a material layer.

surround—to enclose around over half a perimeter of an object.

system—a collection of mechanisms, devices, machines, articles of manufacture, processes, data, and/or instructions, the collection designed to perform one or more specific functions.

temperature—a measure of kinetic energy of a substance.

through—moving in a first side of something and to a second side thereof.

transmit—to send, provide, furnish, and/or supply.

trash debris that obstructs flow.

tube—an elongate member having a longitudinal axis and defining a longitudinal cross-section resembling any closed shape such as, for example, a circle, a non-circle such as an oval (which generally can include a shape that is substantially in the form of an obround, ellipse, limacon, cardioid, cartesian oval, and/or Cassini oval, etc), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

water—a colorless, transparent, odorless liquid that forms the seas, lakes, rivers, and rain and is the basis of the fluids of living organisms.

watertight—substantially impervious to water penetration.

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 3 5 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a pump;
a platform, the platform comprising:
   a first tube;
   a second tube;
   a third tube, the third tube constructed to be coupled to the pump and house the pump, each of the first tube and the second tube constructed to add buoyancy to the platform, the third tube defining a set of tube apertures via which water flows to the pump;
   a first end plate, the first end plate coupled to each of the first tube, the second tube, and the third tube;
   a second end plate, the second end plate coupled to each of the first tube, the second tube, and the third tube; and
   an encasement, the encasement substantially surrounding a portion of each of the first tube, the second tube, and the third tube, the encasement coupled to the first end plate and the second end plate, the encasement comprising a strainer screen, the strainer screen located on a bottom of the encasement.

2. The system of claim 1, further comprising:
a fourth tube; and
a fifth tube, each of the fourth tube and the fifth tube constructed to add buoyancy to the platform.

3. The system of claim 1, further comprising:
an electrical cable, the electrical cable electrically coupled to the pump, the electrical cable substantially watertight.

4. The system of claim 1, wherein:
the strainer screen is constructed to rest in proximity to a bottom surface of a water source when the encasement comprises water.

5. The system of claim 1, wherein:
the strainer screen is substantially planar.

6. The system of claim 1, wherein:
a set of screen apertures defined by the strainer screen are less than one millimeter in diameter.

7. The system of claim 1, wherein:
a set of screen apertures defined by the strainer screen are constructed to pass water at a flow rate of less than 0.5 feet per second.

8. The system of claim 1, wherein:
trash falls off of the strainer screen when water flow through the strainer screen stops.

9. The system of claim 1, wherein:
the encasement comprises feet, the feet constructed to keep the strainer screen off a bottom of a water source.

10. The system of claim 1, wherein:
the platform comprises materials that resist corrosion relative to carbon steel.

11. The system of claim 1, wherein
the platform comprises materials that resist conductance of electricity relative to carbon steel.

12. The system of claim 1, wherein:
the pump is coupled to the third tube via a flange, the pump restrained from rotation via being coupled to the flange.

13. The system of claim 1, wherein:
the platform comprises plastic.

14. The system of claim 1, wherein:
the platform comprises steel.

15. A system comprising:
a pump;
a platform, the platform comprising:
   a set of flotation tubes, each of the set of flotation tubes constructed to add buoyancy to the platform;
   a pump tube, the pump tube constructed to be coupled to the pump and house the pump;
   an encasement, the encasement substantially surrounding a portion of the pump tube and a portion of at least one of the set of flotation tubes; and
   a control tube, the control tube coupled to the encasement, the control tube coupled to each of an air source and a water source;
   wherein:
      a top of the encasement is constructed to be substantially watertight;
      when water enters into the encasement via the control tube, the system sinks in water; and
      when air enters into the encasement via the control tube, the system rises in the water source.

16. A method comprising:
causing air to flow through a control tube to an encasement of a pump system, the air causing the encasement to rise in water, the pump system comprising:
a pump;
a platform, the platform comprising:
   a set of flotation tubes, each of the set of flotation tubes constructed to add buoyancy to the platform;
   a pump tube, the pump tube constructed to be coupled to the pump and house the pump;
   the encasement, the encasement substantially surrounding a portion of the pump tube and a portion of at least one of the set of flotation tubes, a top of the encasement constructed to be substantially watertight, the encasement comprising a strainer screen, the strainer screen located on a bottom of the encasement; and
   wherein the control tube is coupled to the encasement, the control tube coupled to each of an air source and a water source.

17. The method of claim 16, further comprising:
causing water to flow through the control tube to the encasement, the water causing the encasement to sink in the water source.

18. The method of claim 16, further comprising:
cleaning the strainer screen via a directed backflow of water.

19. The method of claim 16, further comprising:
responsive to a detected temperature in the water source, automatically changing an elevation of the pump system in the water source.

20. The method of claim 16, further comprising:
leveling the platform via one or more flotation tubes of the set of flotation tubes, the one or more flotation tubes coupled to the platform.

* * * * *